Dec. 19, 1967     H. A. WILSON     3,358,647

PET PAN

Filed Feb. 23, 1966

INVENTOR

Henry A. Wilson

BY

ATTORNEY

United States Patent Office 3,358,647
Patented Dec. 19, 1967

3,358,647
PET PAN
Henry A. Wilson, 1000 Eldorado Ave.,
Clearwater Beach, Fla. 33515
Filed Feb. 23, 1966, Ser. No. 529,285
9 Claims. (Cl. 119—1)

This invention relates to a pet commode or toilet pan and more particularly to a foldable and disposable receptacle for use in receiving an animal and its excretions.

Dog lovers often keep their pets in and about their homes and away from their free wandering natural out-of-door environment thereby inheriting the problems inherent in confining animals. However, dogs can be trained to exercise at least some of their body functions in a given location thereby reducing the problem of keeping dogs as pets.

It is an object of this invention therefor to provide a tray-like receptacle producing combination, comprising a tubular frame with a readily removable cover for placement with the frame upon the floor or other flat supporting surface for the cover for receiving and containing animal excretions.

A further object of this invention is to provide a pan or tray-like pet commode as aforesaid which is liquid impervious and which can be easily assembled and/or set up and/or knocked down for use in any required location having the required supporting surface.

A still further object of this invention is to provide a readily handled device in the general form of a pan or tray as aforesaid which is unobtrusive, useful and time saving and which may be readily knocked down for packaging and handling in commerce.

Figure 1:
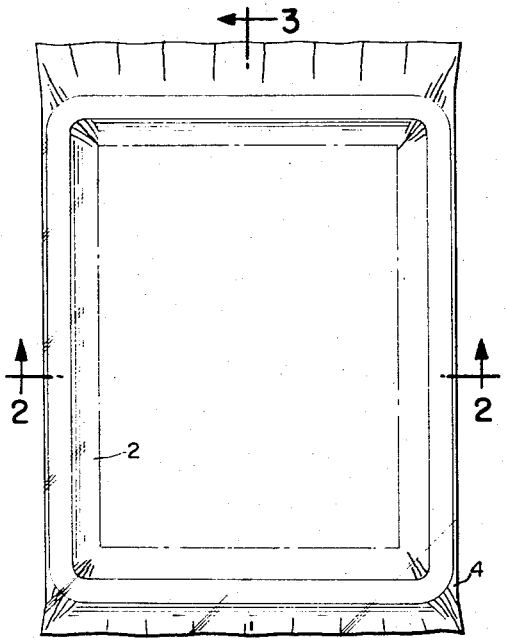
Figure 2:
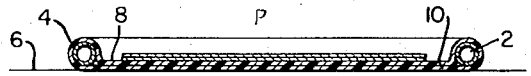
Figure 6:
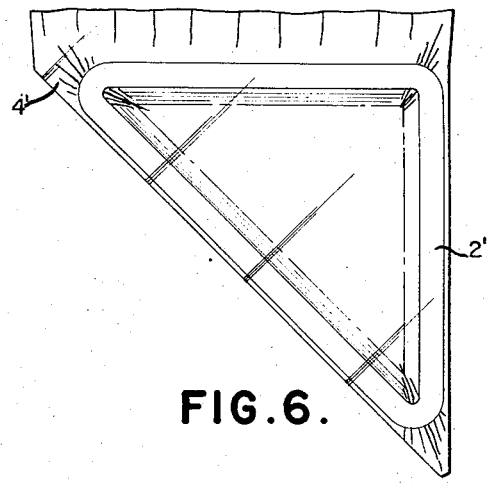
Figure 3:
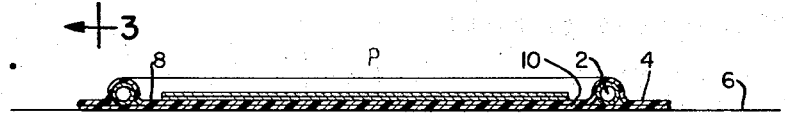
Figure 4:
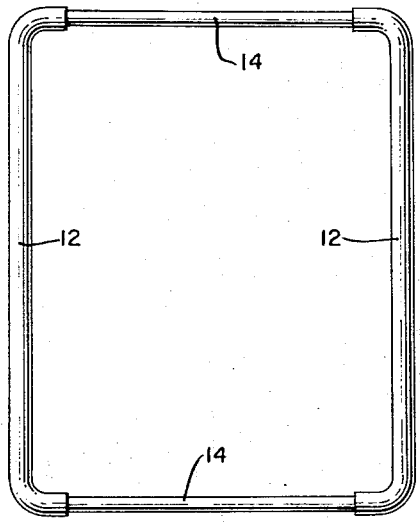
Figure 5:
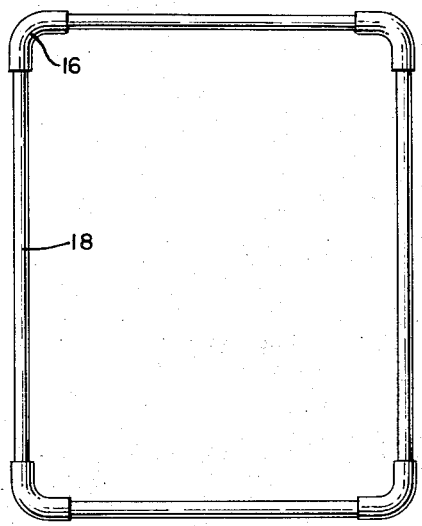

These and other objects of the invention will become manifest upon reading the following description in conjunction with the accompanying drawing wherein:

FIG. 1 shows a plan view of the pan of the invention;
FIG. 2 is a section along the line 2—2 of FIG. 1;
FIG. 3 is a section taken on the line 3—3 of FIG. 1;
FIG. 4 is a plan view of a modification of the frame of the invention;
FIG. 5 is a plan view of another modification of frame; and
FIG. 6 is a still further modification of frame and supported plastic bag.

In accordance with the invention a pan or tray-type device is formed by a water-proof covering, a tubular frame with a loosely fitting bag of a flexible water-proof material such as rubber or a synthetic plastic. The looseness is such that the portions of the bag-like covering within the margin of the frame willl lay below the top of the frame and rest upon the floor or other supporting surface to thereby form a dish-like liquid proof container. The tubular frame may be made of transparent colorless plastic pipe which, when used with a transparent colorless bag of plastic provides an unobtrusive pan. If desired, colored materials may be used to blend with a colored surrounding or background.

In FIG. 1 is illustrated a frame comprising a continuous pipe or rod 2 in the form of a loop or rectangle and made of a transparent colorless material such as methyl of ethyl methacrylate. A bag-like cover 4 of a colorless, transparent, liquid impervious material such as polyethylene of a size to loosely enclose the frame. The looseness is such that when the frame is enclosed by the bag and laid flat on a supporting surface 6 such as a floor, the upper layer 8 of the bag may be supported and will lay flat on the lower layer 10 to form therewith a double thickness dish-like container having a depth substantially equal to the diameter of the pipe or rod 2.

In FIG. 4 is shown a form of knockdown frame made of a pair of U-tubes 12 connected by rods or tubes 14 fitted into the ends of the tubes.

In FIG. 5 is shown another form of knockdown frame made of four elbows 16 having rods or tubes 18 fitted into the elbows and fixed therein.

Although these frames have been shown as rectangular other shapes may also be used to lend an air of dignity to the pan. In like manner other materials such as rubberized or other liquid impervious paper may be used for the bag and other materials such as wood or metal may be used for the margin forming frame members.

While I have described a workable and useful pan or tray-like device suitable for receiving and retaining the excretions of household animals, as is shown in FIG. 1, it will be understood that I propose to use in such a device a disposable absorbent material P such as newspaper either cut up and marketed under the trade name of "Kitty Litter" or just plan sheets of such newspaper P as shown in FIGS. 2 and 3. This has proved very satisfactory in use.

Having now described my invention I claim:

1. An animal toilet comprising a planar plural sided closed frame member and a liquid impervious bag loosely enclosing the frame and providing a dished pan having sides formed by said frame and an intermediate double thickness wall rested upon a supporting surface for the frame.

2. A toilet as defined in claim 1 wherein the frame is rectangular and formed of a continuous, transparent rod.

3. A toilet as defined in claim 2 wherein the rod is an acrylic resin.

4. A device as defined in claim 3 wherein the rod is methyl methacrylate.

5. A device as defined in claim 1 wherein the bag-like cover is a colorless transparent material.

6. A device as defined in claim 5 wherein the covering material is polyethylene.

7. A device as defined in claim 1 wherein the frame is rectangular and formed of facing parallel U-shaped tubes and rods fitted in the legs of the U.

8. A device as defined in claim 1, wherein the frame is rectangular and formed of four elbows and rods fitted in and connecting the elbows.

9. A device as defined in claim 1 wherein the frame is triangular.

References Cited
UNITED STATES PATENTS

| | | | |
|---|---|---|---|
| 1,820,284 | 8/1931 | Mills | 119—1 |
| 1,890,163 | 12/1932 | Rose | 119—1 X |
| 2,738,915 | 3/1956 | St. Clair | 229—2.5 |
| 3,154,052 | 10/1964 | Sweeney | 119—1 |
| 3,227,137 | 1/1966 | Goldman et al. | 119—1 |

ALDRICH F. MEDBERY, *Primary Examiner.*